(12) United States Patent
Gernhart et al.

(10) Patent No.: US 6,795,482 B2
(45) Date of Patent: Sep. 21, 2004

(54) LASER BEAM OPTICS IN A ROBOT LINK

(75) Inventors: Peter Gernhart, Klingenberg (DE);
Stephan Knopp, Wolfsburg (DE);
Matthias Miessen, Eschweiler (DE);
Günter Neumann, Aachen (DE)

(73) Assignee: Thyssen Laser-Technik GmbH, Aachen (DE)

( * ) Notice: Subject to any disclaimer, the term of this patent is extended or adjusted under 35 U.S.C. 154(b) by 216 days.

(21) Appl. No.: 10/025,163

(22) Filed: Dec. 18, 2001

(65) Prior Publication Data

US 2002/0093747 A1 Jul. 18, 2002

(30) Foreign Application Priority Data

Dec. 18, 2000 (DE) .......................................... 100 63 125
Dec. 18, 2000 (DE) .................................... 200 21 369 U
Jun. 27, 2001 (DE) .......................................... 101 31 005

(51) Int. Cl.[7] .............................................. H01S 3/00
(52) U.S. Cl. ...................................... 372/109; 372/107
(58) Field of Search ....................... 219/121.78, 121.85, 219/121.6; 359/861, 865, 867, 153; 356/153; 372/109, 101, 99, 100, 107, 108

(56) References Cited

U.S. PATENT DOCUMENTS

| | | | | |
|---|---|---|---|---|
| 4,618,759 A | * | 10/1986 | Muller et al. ........... | 219/121.75 |
| 4,650,952 A | * | 3/1987 | Akeel ...................... | 219/121.74 |
| 4,659,916 A | * | 4/1987 | Muller et al. ............. | 250/203.1 |
| 4,689,467 A | * | 8/1987 | Inoue ....................... | 219/121.6 |
| 4,707,596 A | * | 11/1987 | Hohberg ................... | 250/201.8 |
| 5,034,618 A | * | 7/1991 | Akeel et al. ............ | 250/559.33 |
| 5,038,015 A | * | 8/1991 | Einav et al. ............ | 219/121.78 |
| 6,127,647 A | * | 10/2000 | Matsuo et al. ......... | 219/121.63 |
| 6,447,503 B1 | * | 9/2002 | Wynne et al. ................. | 606/9 |

FOREIGN PATENT DOCUMENTS

EP  0 901 875 A1  3/1999

* cited by examiner

Primary Examiner—Don Wong
Assistant Examiner—Tuan N. Nguyen
(74) Attorney, Agent, or Firm—Gudrun E. Huckett

(57) ABSTRACT

The laser beam optics for a robot link, wherein a first beam path of a first working laser beam is arranged on the longitudinal axis of the robot link, the first beam path is deflected at an end facing a workpiece into an axis-parallel second beam path, and a third beam path of a second working laser beam is axis-parallel to the first beam path in the robot link, have two optical elements arranged successively in one of the first and second beam paths of the first working laser beam. The two optical elements are transmissive for the first working laser beam in a transmission direction toward a workpiece and are adjusted relative to one another so as to compensate laser beam displacement of the first working laser beam. The second optical element arranged downstream receives the second working laser beam and reflects it toward the workpiece.

19 Claims, 5 Drawing Sheets

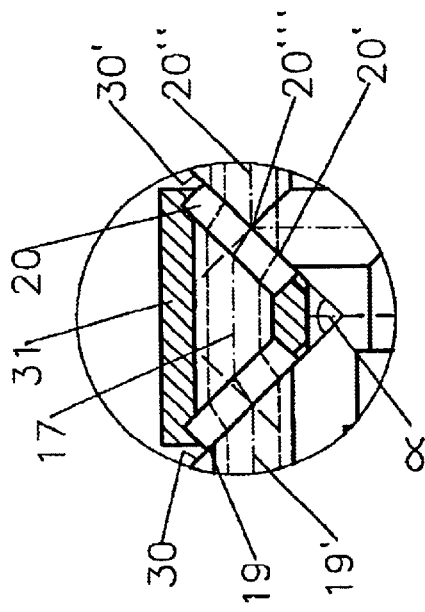
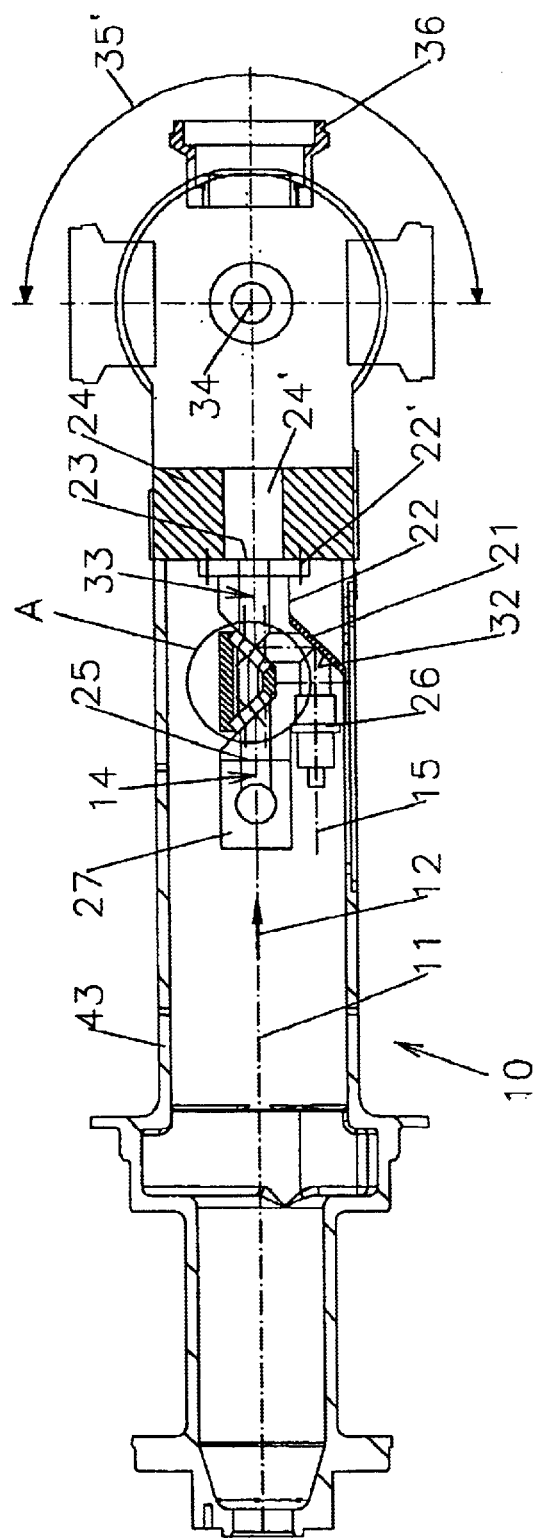

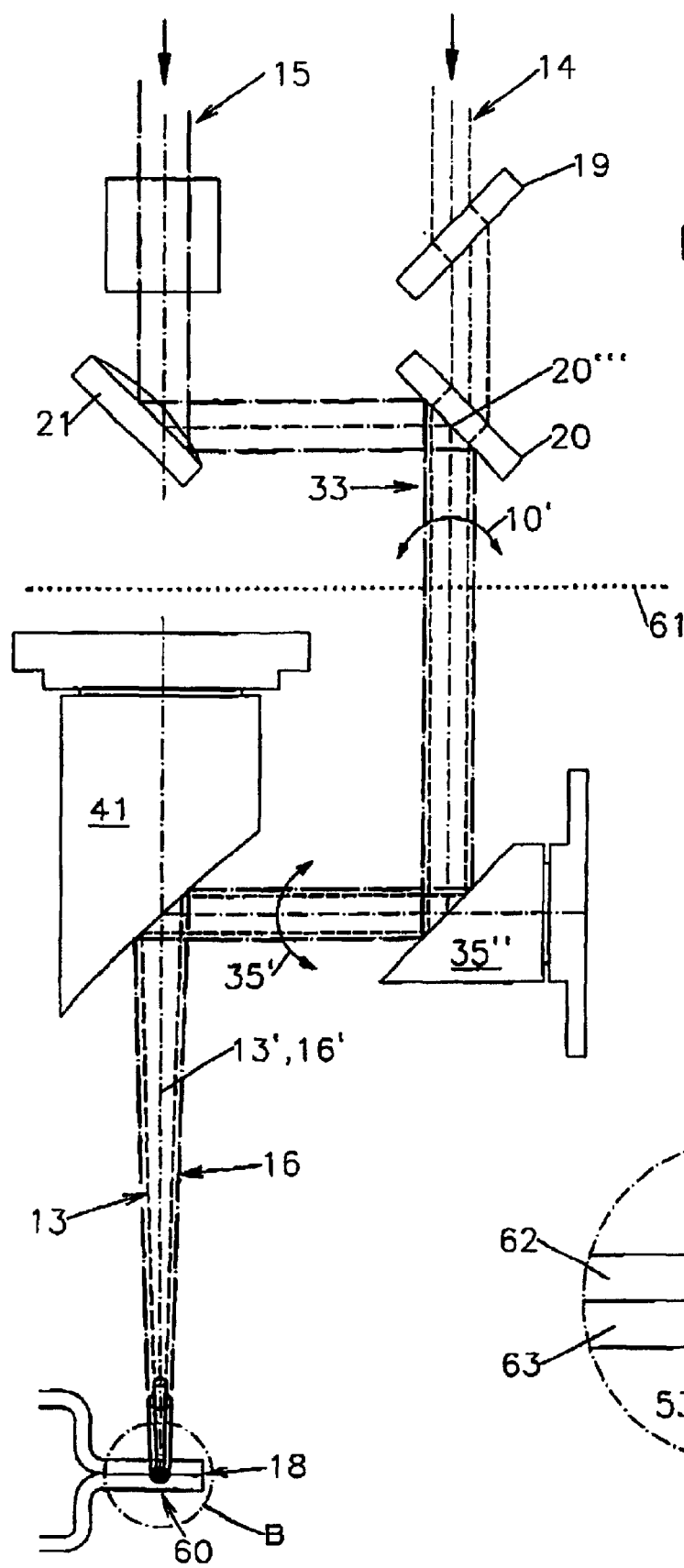

LASER BEAM OPTICS IN A ROBOT LINK

BACKGROUND OF THE INVENTION

1. Field of the Invention

The invention relates to laser beam optics in a robot link, wherein a first beam path of a first working laser beam is to be arranged in the longitudinal axis of the robot link, which first laser working beam is deflectable at an end facing the workpiece into an axis-parallel second beam path, and wherein a third beam path of a second working laser beam is to be arranged axis-parallel to the first beam path of the first working laser beam in the robot link.

2. Description of the Related Art

Optics with the aforementioned features are known from EP-A-0 901 875. The first working laser beam of the known robot is guided to an attachment unit which has the task of deflecting the first laser beam from the first beam path into the second beam path which is axis-parallel to the first beam path. In the known laser robot a third beam path of a second working laser beam can be provided, in particular, such that it is to be arranged parallel to the first beam path of the first working laser beam. However, this is possible only when the attachment unit for deflection of the first working laser beam is removed. This is so because the attachment unit projects into the second and also into the third beam path since these two aforementioned beam paths are aligned with one another. Accordingly, when different types of working laser radiation are to be employed, for example, a $CO_2$ laser radiation or a diode laser radiation, a retrofitting of the robot link must be carried out during which the attachment unit is to be either mounted or demounted. This is complex and requires a subsequent adjustment. Moreover, it is not possible to operate the robot simultaneously with two laser beams.

SUMMARY OF THE INVENTION

It is an object of the present invention to improve laser beam optics with the aforementioned features such that they are suitable for an alternating use of different working laser radiation without requiring retrofitting, and primarily are suitable for the simultaneous use of two different working laser radiations.

In accordance with the present invention, this is achieved in that in one of the beam paths of the first working laser beam two optical elements are successively arranged which are transmissive for the working laser beam in the direction toward the workpiece and which are adjusted to one another in the sense of a compensation of a beam displacement, and in that the second working laser beam is guided to the second one of the two optical elements and can be reflected by it toward the workpiece.

It is important in regard to the invention that by means of the laser beam optics two working laser beams can be combined such that both can perform alternatingly or together the desired machining of a workpiece in one working step. In this connection, the working laser beams should be able to have different radiation, respectively, i.e., radiation having different radiation parameters. The first working laser radiation should be, for example, $CO_2$ radiation and the second working laser radiation should be Nd:YAG radiation. It is to be taken care of that the laser beam optics can combine the beams error-free. This is achieved particularly in that the first working laser beam passes through optical elements successively which are adjusted relative to one another in the sense of avoiding beam displacement. As a result of this, the combination location of the laser beam optics is constructively fixed. It is not required to provide other optical measures in order to compensate the beam displacement. Otherwise, it would be required to mount components at a location downstream where no space is available within the robot link for the purpose of performing compensating measures.

An advantageous embodiment of the laser beam optics is characterized in that the first optical element is a beam-transmissive compensation plate, that the second optical element is a reflector plate, which is also beam-transmissive but reflects the second working laser beam, and that the entry symmetry axis of the compensation plate and the exit symmetry axis of the reflector plate are aligned. In this way, the beam displacement can be compensated by two plates whose refractive properties are identical and which act relative to one another in a compensating way with regard to the beam displacement.

In this connection it is to be preferred that the two optical elements are arranged at an angle to one another which compensates a beam displacement.

Instead of plates, all optically active components can be employed with which a beam compensation can be eliminated. In this respect, it can be expedient to configure the laser beam optics such that at least one optical element is comprised of two prisms which act optically as a plate.

When the two optical elements are transmissive for $CO_2$ laser radiation, conventional plate materials can be used which, with respect to 10.6 $\mu$m radiation of a $CO_2$ laser, are well researched and established, for example, zinc selenide.

It is then advantageous and necessary to configure the laser optics such that the second optical element is highly reflective for the Nd:YAG radiation.

In order to achieve a substantially loss-free radiation passage, the laser optics can be configured such that the two optical elements are coated with an anti-reflective coating at the entry side and exit side for the beams. An anti-reflective coating prevents radiation losses at the entry and exit surfaces of the optical elements.

Moreover, the laser optics can be configured such that the second optical element is coated on a reflector surface facing the second working laser beam so as to be highly reflective for the second laser beam. Such a highly reflective coating is particularly required when radiation losses of the second laser beam are to be prevented. Such radiation losses would have to be expected particularly when the second optical element were radiation-transmissive even if only for a radiation of a different wavelength.

An expedient configuration of the laser optics is achieved in that for feeding the second working laser beam to the second optical element a deflection mirror is present which is parallel to the reflector surface of the second optical element. This achieves a right angle deflection of the second laser beam relative to the second beam path.

A constructively particularly advantageous configuration of the laser optics can be achieved in that the two optical elements and, if needed, a deflection mirror are arranged in a single housing. This provides a modular unit which ensures a fixed correlation of the optical elements relative to one another independent of the assembly of this modular unit on the robot link. The housing can be robust so that the configuration and function of the two optical elements are not endangered, in particular, during mounting of the housing on the robot link.

In another embodiment of the invention, the laser optics can be embodied such that a housing having a beam exit is mounted on an end face of the robot link facing the workpiece and is provided at the end facing away from the workpiece with a first beam entrance for the first working laser beam and a second beam entrance for the second working laser beam. This provides a simple and reliable attachment of the housing as well as a matching correlation of the beam entrances relative to the beam paths.

The laser beam optics can have a configuration such that a beam displacement module is attached to the housing in the area of its first beam entrance and has a first displacement mirror in the area of the first beam path and a second displacement mirror at the beginning of the second beam path. The deflection of the first working laser beam is realized accordingly by means of a special component which is configured especially with regard to its deflection or displacement task and can be attached additionally to the housing that contain the two optical elements.

A special configuration of the laser beam optics can be provided in that the housing in the area of the second beam path has a mounting cutout in which an element support comprising the optical elements is mounted. The element support enables particularly a matched arrangement of the elements relative to one another. As for the rest, the housing can be configured independent of the element support, and it is only necessary that the housing in the area of the attachment of the element support has a precise enough configuration in order to fulfill the optical requirements with regard to avoiding beam displacement.

The laser beam optics can moreover be improved in that the deflection mirror optically arranged upstream of the second optical element is secured on an exterior housing wall which is parallel to a wall of the mounting cutout facing the workpiece. The exterior wall of the housing and the wall of the mounting cutout can be manufactured parallel with high precision. This is advantageous in regard to the optical precision of the beam combination.

In order to make the laser beam optics suitable for use with such a robot link, which has arranged downstream further links of a robot hand, the laser beam optics can be configured such that the second beam path and a fourth beam path, beginning at the reflecting optical element and common to both laser beams, are arranged in a plane, defined by the longitudinal axis of the robot link and a pivot axis perpendicular thereto of an additional robot link, and spaced at a predetermined spacing from the longitudinal axis of the robot link. As a result of this, the beam path common to both working beams can be located in the vicinity of an outer periphery of the robot link, components required for the downstream links can be arranged in its longitudinal axis, and only one single mirror is required for beam deflection into the pivot axis of the additional robot link.

BRIEF DESCRIPTION OF THE DRAWING

In the drawing:

FIG. 3 is a simplified side view of the robot link of FIG. 2 with sectioned details;

FIG. 3a shows an enlarged detail illustration A of FIG. 3;

FIG. 4 shows a schematic beam path in a robot link;

FIG. 4a shows the detail B of FIG. 4; and

DESCRIPTION OF THE PREFERRED EMBODIMENTS

Figure 1:
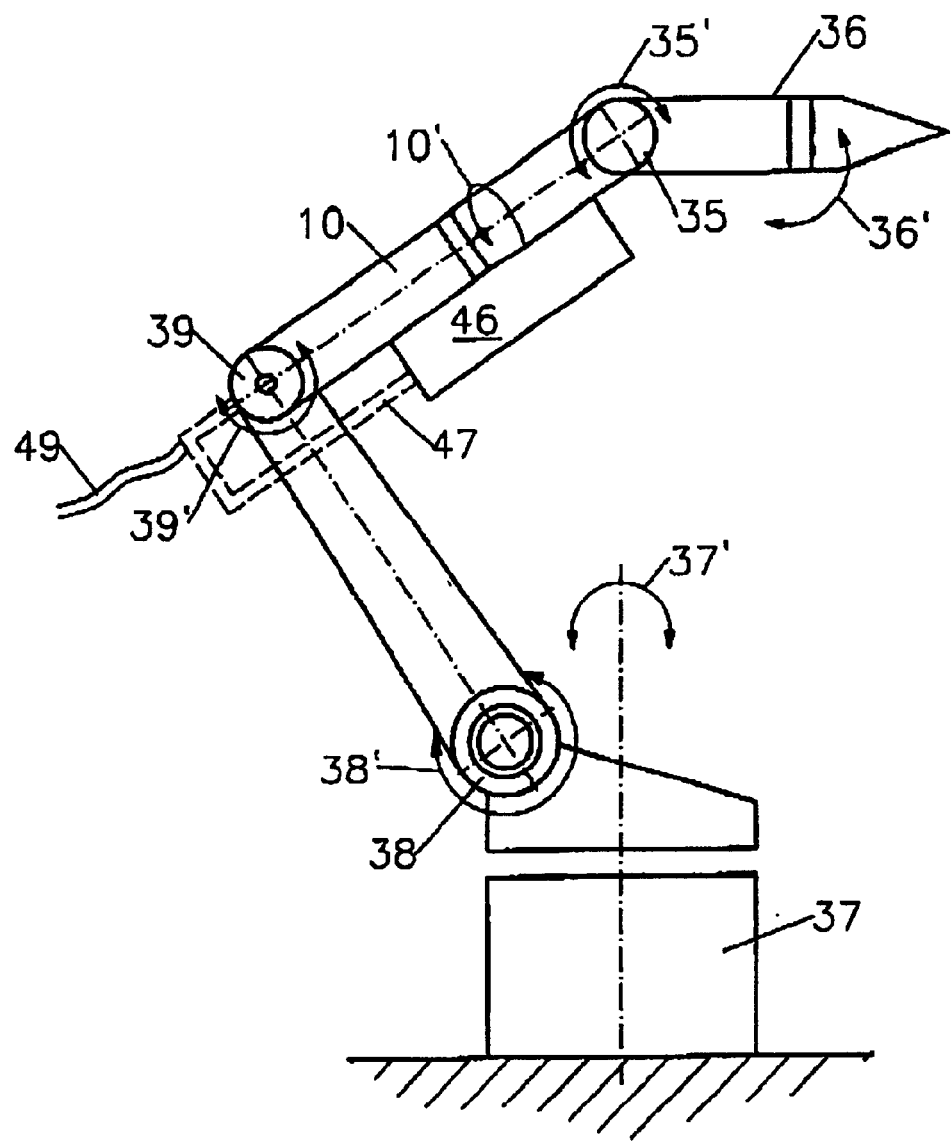
FIG. 1 is a schematic illustration of a buckling arm robot.
Figure 2:
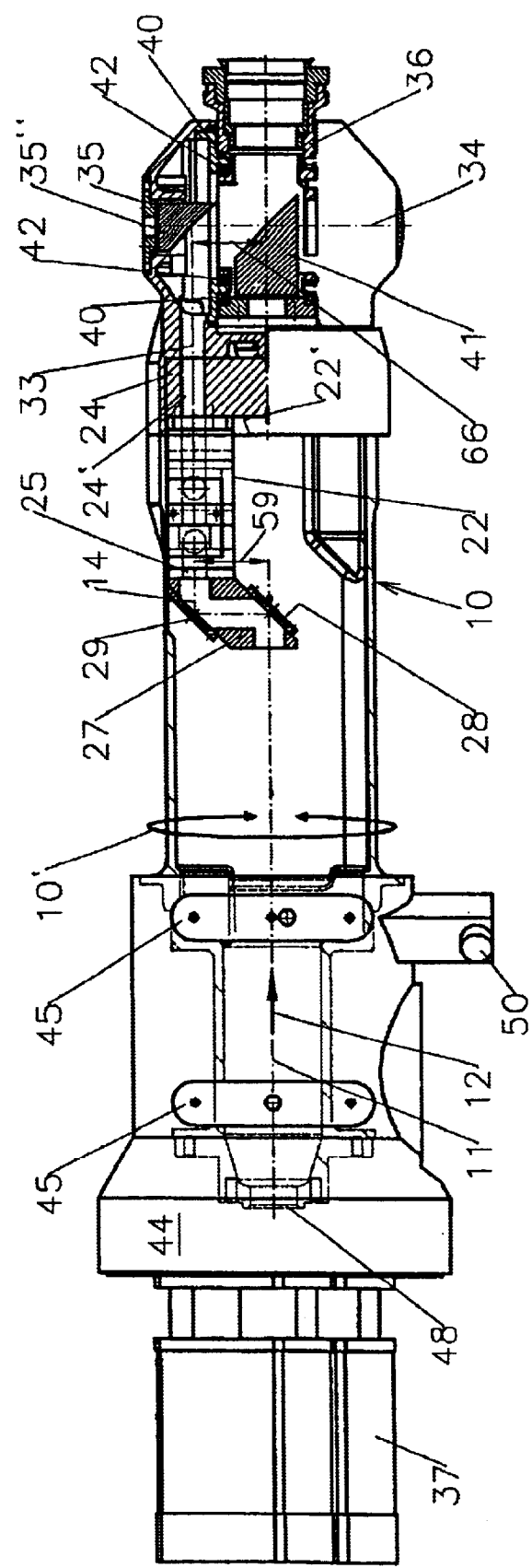
FIG. 2 is a bottom view, partially in a sectioned illustration, of a robot link on which at a side facing the workpiece two additional hand links are arranged.

The buckling arm robot illustrated schematically in FIG. 1 is configured such that it can perform the required movements in all directions of Cartesian coordinates x, y, and z within the limit of the range of its links 37, 38, 39, 10, 35, and 36. All of the aforementioned links are rotational links whose rotational adjustment is realized by motors. FIG. 2 show schematically the arrangement of a drive motor 37 for the robot link 10. The servomotor 37, like the servomotors of the other rotational links, are loaded by a continuous-path control, not explained in detail in this context, such that the desired rotational movement of the links is actuated. The robot is to be used for a three-dimensional machining of workpieces by means of laser radiation, for which purpose a special robot hand is provided which is illustrated in FIGS. 2, 3. This robot arm is comprised substantially of the robot link 10 at the side of the robot and two hand links 35, 36 which are combined with one another constructively. The link 36 is rotatable by means of pivot bearings 40 about its longitudinal axis which is indicated in FIG. 1 by double arrow 36'. In this link 36 the focusing optics 40 are provided with which two working laser beams 13, 16 can be focused onto a workpiece. The hand link 35 can be pivoted about a pivot axis 34 which is formed by a pivot bearing 42. The double arrows 35' in FIGS. 1 and 3 indicate the resulting rotational adjustability of the link 35 of the hand so that the link 36 of the hand can be moved into the positions illustrated in FIG. 3. The link 35 of the hand is otherwise held fixedly by the robot link 10 which has an end face 24 for this attachment at a facing the workpiece.

The robot link 10 is comprised in accordance with FIGS. 2, 3 substantially of a tubular housing 43 which is mounted with its end opposite the end face 24 on the gear box 44 of the motor. The gear box 44 has mounting flanges 45 for a first laser 46 illustrated schematically in FIG. 1. The laser radiation generated by this laser 46 is introduced via a laser radiation feedline 47 and a radiation inlet 48, indicated in FIG. 2, into a first beam path 12 which has a coinciding axis with the longitudinal axis 11 of the robot link 10. Moreover, a non-illustrated second laser is present whose laser radiation is introduced into a third beam path 15 by means of an additional laser radiation feedline 49 which is located within the tubular housing 43 parallel to the first beam path 12. While the first laser 46, for example, is a $CO_2$ laser, the second laser, for example, is an Nd:YAG laser so that the working laser beams 13, 16 generated by the two lasers have correspondingly different wavelengths. The laser 46, for example, has a power of 300 Watt with a beam quality of k=0.7 while the non-illustrated Nd:YAG laser has a power of 200 Watt. The feedline of the laser radiation of the second working laser beam 16 is realized, for example, by means of a flexible line in the form of a glass fiber line connected to a connector element 50 or also to the gear box 44.

In order to be able to guide the working laser beams 13, 16 to the workpiece 18 in the desired and space-saving way, they must be combinable in a predetermined way. This combination is realized primarily with the laser beam optics near the end face 24 which is arranged in a housing 22. The housing 22 is fastened on the end face 34 with fastening means 22' and has here a beam exit 23 which opens into a beam passage 24' of the end wall 24. Opposite the beam exit 23, i.e., facing away from the workpiece, the housing 22 supports a beam displacement module 27. This module 27 has a first displacement mirror 28 which is arranged in the first beam path 12 of the first working laser beam 13 so that this working laser beam 13 impinges on the displacement mirror 28 and is deflected vertically to the first beam path 12. As a result of this deflection, the first working laser beam 13 impinges on a second displacement mirror 29 by which the first working laser beam 13 is deflected into a second beam path 14. The first working laser beam 13 reaches the housing 22 along the second beam path 14 up to the point of its beam exit 23.

The third beam path 15 for the second working laser beam 16 is aligned with a second beam entrance 26 of the housing 22. The second working laser beam 16 impinges on a deflection mirror 22 from where it is deflected perpendicularly to the longitudinal axis 11 and impinges on a reflector surface 20' of a reflector plate 20 which reflects the second working laser beam 16 again at a right angle, i.e., into a fourth beam path 33.

In addition to deflecting the second working laser beam 16, the reflector plate 20 serves also for providing a beam passage of the first working laser beam 13. It passes on its way via the second beam path 40 to the beam path 33 common to both laser beams 13, 16 through two optical elements successively arranged in the beam direction, i.e., first a compensation plate 19 and then a reflector plate 20. The compensation plate 19 has refractive properties causing a beam deflection 17. The reflector plate 20 has also refractive properties which cause an opposite beam deflection which is not explained in detail. Both plates 19, 20 are configured and arranged such that the entry symmetry axis 19' of the compensation plate 19 and the exit symmetry axis 20'' of the reflector plate 20 are aligned with one another. Accordingly, the beam deflection 17 relative to the beam exit location 20''' of the reflector plate 20 is compensated. Mounting of the compensation plate 19 has the effect that the working laser beam 13 leaving the reflector plate 20 exits precisely at a predetermined beam exit location 20'''. This beam exit location 20''' can coincide precisely with the reflection location which is predetermined for the reflection of the working laser beam 16 on the reflector plate 20'. This results in the possibility illustrated in FIG. 4 of employing the working beams 13, 16 coaxially without having to provide special constructive or other adjusting features with respect to the beam deflection 17 in the area of the laser beam optics. Instead, the laser optics can be formed as a modular unit which operates with great precision.

The housing 22 is provided with a mounting cutout 30 illustrated in the plane of illustration of FIG. 3a. This mounting cutout 30 is V-shaped and has an angle α at the tip. This angle is preferably a right angle. An element support 31 which supports both plates 19, 20 can be mounted in this mounting cutout 30. These two plates 19, 20 are also arranged at a right angle so that a mechanically advantageous, i.e., precise, assembly of the element support 31 and the mounting cutout 30 of the housing 22 results. With this assembly it is ensured that the refractive properties of the plates 19, 20 can be compensated as precisely as possible. Further requirements for this are that the plates 19, 20 have the same refractive properties and, for the same material, are especially of the same thickness.

In order for the exit symmetry axis 20'' and the center of the second working laser beam 16 impinging on the reflector surface 22 to be identical or to coincide, the deflection mirror 21 must also be precisely arranged. This is achieved in that the deflection mirror 21 is secured on an external housing wall 32 which is parallel to the wall 30' of the mounting cutout 30 facing the workpiece. Both the walls 30', 32 can be produced to be exactly parallel in order to fulfill the precision requirements.

The laser beam optics should be configured to be as loss-free as possible. For example, zinc selenide is provided for the two plates 19, 20. Moreover, by means of coatings it can be achieved that the laser beam optics have as little optical losses as possible. For example, each plate side of the plates 19, 20 can be coated anti-reflectively. This is realized, for example, by means of a dielectric layer which is comprised of two layers with different refractive index, respectively, selected from the group of fluorides $BaF_2$, $MgF_2$, or $YbF_3$. The reflector surface 20 of the reflector plate 20', on the other hand, must be reflective as much as possible for the radiation of the second working laser beam 16, and this can be achieved by a high-reflective coating. Such a coating was achieved with more than five layers of the aforementioned materials so that it was anti-reflective for $CO_2$ laser radiation but highly reflective for the Nd:YAG laser radiation.

The fourth beam path 33 which is common to both working laser beams 13, 16 leads through the end wall 24 to the link 35. A deviation prism 35'' is arranged here in the area of the pivot axis 34 at a spacing 66 to a symmetry axis of a focusing mirror 41 rotatable together with the hand link 36 so that the working laser beams 13, 16 are deflected to the focusing mirror 41.

Figure 5:
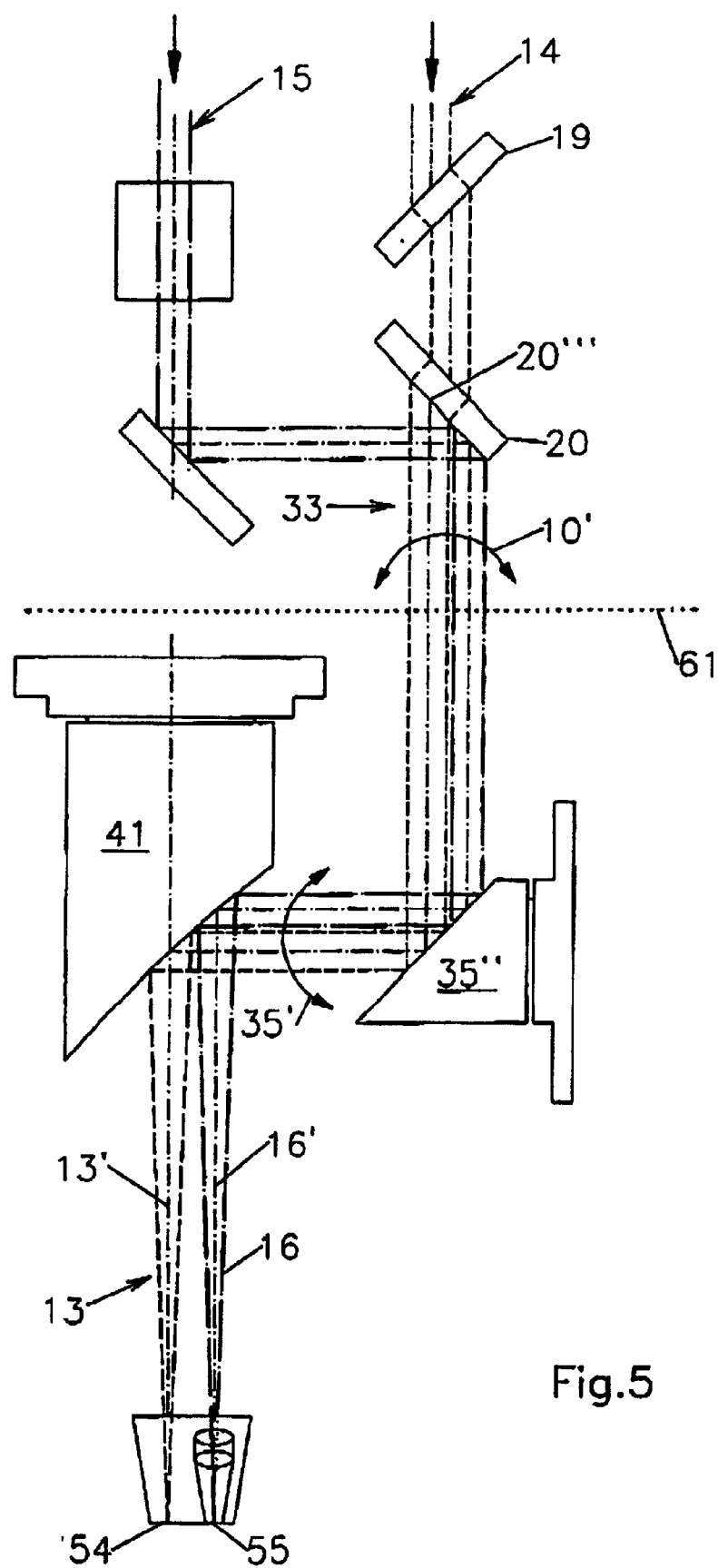
FIG. 5 shows a schematic beam path in a robot link.

A comparison of FIGS. 4, 5 shows that the working laser beams 13, 16 in the common fourth beam path 33 must not be arranged necessarily with coinciding axes. It is instead also possible to provide parallel axes. While in the case of an arrangement of the working laser beams 13, 16 with coinciding axes a simultaneous and/or cycled successive machining of the workpiece 18 can be performed, in that, for example, a cutting location 52 and a welding location 53 are formed, in the case of an arrangement with parallel axes it can be achieved that machining locations 54 or 55 at a predetermined spacing from one another are machined simultaneously and/or successively in a cycled fashion. In all cases a configuration of the laser beam optics is advantageous which, as a result of the afore described configurations, is indifferent to adjusting.

While specific embodiments of the invention have been shown and described in detail to illustrate the inventive principles, it will be understood that the invention may be embodied otherwise without departing from such principles.

What is claimed is:

1. Laser beam optics for a robot link (10) having a longitudinal axis (11), wherein a first beam path (12) of a first working laser beam (13) is arranged on the longitudinal axis (11) of the robot link (10), wherein the first beam path (12) is configured to be deflected at an end facing a workpiece into an axis-parallel second beam path (14), and wherein a third beam path (15) of a second working laser beam (16) is arranged axis-parallel to the first beam path (12) of the first working laser beam (13) in the robot link (10), the laser beam optics comprising:

first and second optical elements arranged successively in one of the first and second beam paths (12 or 14) of the first working laser beam (13) and configured to be transmissive to the first working laser beam (13) in a transmission direction toward a workpiece, wherein the two optical elements are adjusted relative to one another so as to compensate laser beam displacement (17) of the first working laser beam (13), and wherein the second optical element arranged downstream in the transmission direction is configured to receive the second working laser beam (16) and reflect the second working laser beam (16) toward the workpiece (18).

2. Laser beam optics according to claim 1, wherein:
   the first optical element is a compensation plate (19) beam-transmissive for the first working laser beam;
   the second optical element is a reflector plate (20) beam-transmissive for the first working laser beam (13) but reflecting for the second working laser beam (16); and the compensation plate (19) has an entry symmetry axis (19') for the first working laser beam (13) and the reflector plate (20) has an exit symmetry axis (20") for the first working laser beam (13), wherein the entry symmetry axis (19') and the exit symmetry axis (20") are aligned with one another.

3. Laser beam optics according to claim 1, wherein the first and second optical elements are arranged relative to one another at an angle (α) effecting compensation of the laser beam displacement (17).

4. Laser beam optics according to claim 1, wherein at least one of the first and second optical elements is comprised of two prisms which behave optically as a plate.

5. Laser beam optics according to claim 1, wherein the first and second optical elements are transmissive for $CO_2$ laser radiation.

6. Laser beam optics according to claim 1, wherein the second optical element is highly reflective for Nd:YAG laser radiation.

7. Laser beam optics according to claim 1, wherein the first and second optical elements are coated anti-reflectively at a beam entry side and a beam exit side, respectively.

8. Laser beam optics according to claim 1, wherein the second optical element has a reflector surface (20') facing the second working laser beam (16) and coated so as to be highly reflective for the second working laser beam (16).

9. Laser beam optics according to claim 8, further comprising a deflection mirror (21) configured to feed the second working laser beam (16) to the second optical element, wherein the deflection mirror (21) is parallel to the reflector surface (20') of the second optical element.

10. Laser beam optics according to claim 9, further comprising a housing (22), wherein the first and second optical elements and the deflection mirror (21) are arranged in the housing (22).

11. Laser beam optics according to claim 10, wherein the housing (22) has a beam exit (23) and is arranged on an end face (24) of the robot link (10) facing the workpiece, wherein the housing (22) is provided, at a side facing away from the workpiece, with a first beam entrance (25) for the first working laser beam (13) and a second beam entrance (26) for the second working laser beam (16).

12. Laser beam optics according to claim 11, further comprising a beam displacement module (27) mounted on the housing (22) in the area of the first beam entrance (25) and comprising a first displacement mirror (28) within the first beam path (12) and a second displacement mirror (29) at the beginning of the second beam path (14).

13. Laser beam optics according to claim 11, further comprising an element support (31) configured to receive the first and second optical elements, wherein the housing (22) has a mounting cutout (30) within the second beam path (14) and wherein the element support (31) with the first and second optical elements is mounted in the mounting cutout (31).

14. Laser beam optics according to claim 13, wherein the deflection mirror (21) is secured on an exterior wall (32) of the housing (22), wherein the exterior wall (32) extends parallel to a wall (30) of the mounting cutout (30) at a side facing the workpiece.

15. Laser beam optics according to claim 1, further comprising a fourth beam path (33), beginning at the second optical element and common to the first and second working laser beams (13, 16), wherein the second beam path (16) and the fourth beam path (33) are arranged in a plane, defined by the longitudinal axis (11) of the robot link (10) and a pivot axis (34) perpendicular thereto of an additional robot link (35), and at a predetermined spacing (59) from the longitudinal axis (11) of the robot link (12).

16. Laser optics according to claim 1, further comprising a housing (22), wherein the first and second optical elements are arranged in the housing (22).

17. Laser beam optics according to claim 16, wherein the housing (22) has a beam exit (23) and is arranged on an end face (24) of the robot link (10) facing the workpiece, wherein the housing (22) is provided, at a side facing away from the workpiece, with a first beam entrance (25) for the first working laser beam (13) and a second beam entrance (26) for the second working laser beam (16).

18. Laser beam optics according to claim 17, further comprising a beam displacement module (27) mounted on the housing (22) in the area of the first beam entrance (25) and comprising a first displacement mirror (28) within the first beam path (12) and a second displacement mirror (29) at the beginning of the second beam path (14).

19. Laser beam optics according to claim 18, further comprising an element support (31) configured to receive the first and second optical elements, wherein the housing (22) has a mounting cutout (30) within the second beam path (14) and wherein the element support (31) with the optical elements is mounted in the mounting cutout (31).

* * * * *